United States Patent [19]

Tateoka et al.

[11] Patent Number: 4,708,908
[45] Date of Patent: Nov. 24, 1987

[54] PLASTIC PARTS WITH SURFACE-HARDENING COATING CONTAINING ULTRAVIOLET ABSORBER

[75] Inventors: Yasuo Tateoka, Yokosuka; Ryuzo Uemura, Miura; Takatoshi Sagawa, Yokohama, all of Japan

[73] Assignee: Nissan Motor Co., Ltd., Yokohama City, Japan

[21] Appl. No.: 780,885

[22] Filed: Sep. 27, 1985

[30] Foreign Application Priority Data

Oct. 5, 1984 [JP] Japan .................................. 59-208301

[51] Int. Cl.$^4$ ............................................. B32B 27/18
[52] U.S. Cl. ................................ 428/423.1; 428/411.1; 428/447; 428/448; 428/451; 428/500; 428/502; 428/524; 428/690; 428/913
[58] Field of Search ....................... 428/690, 913, 411.1, 428/423.1, 424.2, 425.3, 425.5, 447, 451, 500, 502, 524, 448; 427/164

[56] References Cited

U.S. PATENT DOCUMENTS

| | | | |
|---|---|---|---|
| 3,212,898 | 10/1965 | Cerreta | 96/90 |
| 3,666,352 | 5/1972 | Wagner et al. | 350/160 |
| 4,289,497 | 9/1981 | Hovey | 427/164 |

Primary Examiner—John E. Kittle
Assistant Examiner—P. R. Schwartz
Attorney, Agent, or Firm—Schwartz, Jeffery, Schwaab, Mack, Blumenthal & Evans

[57] ABSTRACT

Disclosed is an improved surface-hardening coating on a plastic body such as a plastic lens. The surface-hardening coating consists of a hard-coat layer of a polymer base composition and an underlying primer layer, which contains an ultraviolet absorber low in the bleeding tendency amounting to 0.5–50 wt % of the plastic component of the primer. A triazole having a vapor pressure not higher than $1 \times 10^{-5}$ KPa at 100° C. is preferred as the ultraviolet absorber. The introduction of such an ultraviolet absorber into the primer layer has the effect of greatly enhancing the durability and weatherability of the coating without sacrificing the surface hardness.

15 Claims, 6 Drawing Figures

PLASTIC PARTS WITH SURFACE-HARDENING COATING CONTAINING ULTRAVIOLET ABSORBER

BACKGROUND OF THE INVENTION

This invention relates to plastic parts provided with a surface-hardening coating film containing an ultraviolet absorber. A typical example of such plastic parts is a plastic lens for automobile headlamps.

Many kinds of plastic parts for automobiles, buildings, audio and video appliances, etc. are provided with a surface-protecting or surface-hardening coating film. In many cases nonmetallic polymers are used for the coating purpose, and in such cases it is usual to produce a two-layer coating film consisting of a primer layer and a top-coat layer that is a hard-coat layer. For coating plastic parts that are required to possess transparency, such as plastic lenses, it is prevailing to use an acrylic resin base or silicone base hard-coat material with a view to enhancing scratch resistance of the coating film. It is often, and it is usual where the coated plastic parts are for outdoor uses, to add an organic compound that serves as an ultraviolet absorber to the hard-coat material.

By testing with a sunshine weather-O-meter, durabilities of conventional surface-hardening coatings on plastic parts rarely exceed the level of 2000 hr. For most of plastic parts for automobiles the 2000 hr level of durability can be taken as assurance of sufficient practicability. However, further durability or weatherability is required of some exterior parts which must long retain transparency such as windows and lenses for headlamps. It is conceivable to increase the content of the ultraviolet absorber in the hard-coat layer of the surface-hardening coating, but this measure causes lowering of the surface hardness of the coating.

SUMMARY OF THE INVENTION

It is an object of the invention to provide a plastic part having a surface-hardening coating film which possesses improved durability and weatherability as well as sufficiently high hardness of the surface.

As a clue to the accomplishment of the above object, we have recognized that the durability of a surface-hardening coating of the above described category is significantly affected by the bleeding tendency of the contained ultraviolet absorber and that the ultraviolet absorbers used in conventional hard-coat materials are relatively high in the bleeding tendency. The present invention has been reached by our discovery that the durability and weatherability of a surface-hardening coating film of the two-layer structure can remarkably be enhanced without sacrificing the surface hardness by introducing a limited amount of an ultraviolet absorber which is relatively low in the bleeding tendency into the primer layer underneath the hard-coat layer.

A plastic part according to the invention comprises a plastic body and a surface-hardening coating film which is formed on a surface of the plastic body and comprises a plastic primer layer laid directly on that surface and a hard-coat layer of a polymer base composition laid on the primer layer. The primer layer contains an ultraviolet absorber which is low in the bleeding tendency and amounts to 0.5–50 wt% of the plastic component of the primer.

As the ultraviolet absorber in the primer layer of this invention, it is preferred to use an organic compound having a vapor pressure not higher than $1 \times 10^{-5}$ KPa at 100° C. An ultraviolet absorbing compound having such a vapor pressure can be found among triazole compounds and thiazole compounds.

Aside from the ultraviolet absorber, a surface-hardening coating film according to the invention can be produced by using a conventional primer material and a conventional hard-coat material. Of course the plastic body itself may be of any kind of synthetic resin and may be of any shape.

A surface-hardening coating film according to the invention is excellent in both weatherability and surface hardness. It is not seldom that the durability of this surface-hardening coating film by testing with a sunshine weather-O-meter exceeds the level of 3000 hr.

An important and practically valuable embodiment of the present invention is a plastic lens for automobile headlamps.

DESCRIPTION OF THE PREFERRED EMBODIMENTS

Figure 1:
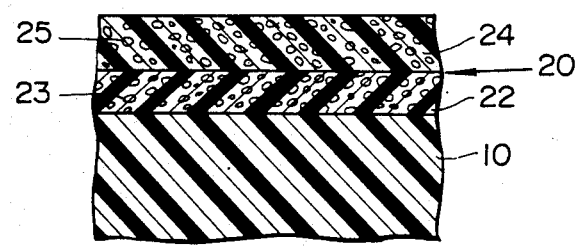
FIG. 1 is a sectional, fractional and explanatorily enlarged view of a plastic part having a surface-hardening coating according to the invention.

FIG. 1 shows the construction of a plastic part according to the invention. Numeral 10 indicates the body of the plastic part, which may be of any shape and is formed of a conventional synthetic resin such as, only for example, acrylic resin, ABS resin, polycarbonate resin, polyester resin, nylon, polystyrene resin, polysulfone resin or poly(diethylene glycol bisallylcarbonate) resin. A desired surface of the plastic body 10 is coated with a surface-hardening coating film 20, which consists of a primer layer 22 on the inner side and a hard-coat layer 24 on the outer side. The basic material of the primer layer 22 is not specified. Any conventional primer for plastics may be used for this primer layer 22. For example, the primer may be of an acrylic resin base, silicone base or polyurethane base. The primer layer 22 contains an ultraviolet absorber 23 which is substantially uniformly dissolved, or dispersed, in the primer material. As stated hereinbefore, the ultraviolet absorber 23 is selected from ones that are relatively low in the bleeding tendency. The hard-coat layer 24 is formed of a conventional hard-coat material of any type. For example, a free selection can be made from silicone base, melamine resin base and acrylic resin base hardcoat materials. The hard-coat layer 24 may contain an ultraviolet absorber 25, which is an ingredient of the employed conventional hard-coat material and is relatively high in the bleeding tendency. However, the hard-coat layer 24 in the present invention does not necessarily contain an ultraviolet absorber.

Various compounds have been used as ultraviolet absorbers for addition to plastics. Such compounds are considerably different in vapor pressure at a given temperature, and we have found that there is a correlation between the vapor pressure of an ultraviolet absorbing compound and the bleed rate of that compound when used as an additive to the primer for a surface coating.

(J) ethyl-2-cyano-3,3-diphenyl acrylate (MW 277, b.p. 95° C.)
(K) nickel dibutyl-dithiocarbamate (MW 466, b.p. 85° C.)
(L) 2-[2-hydroxy-3,5-bis($\alpha,\alpha$-dimethylbenzyl)phenyl]-benzotriazole (MW 447, b.p. 135° C.)

With respect to these ultraviolet absorbers, Table 1 shows the vapor pressure at 100° C. and the durability of a primer layer formed of an acrylic primer to which each individual ultraviolet absorber was added so as to amount to 10 wt% of the solid component of the primer. The durability was measured with a sunshine weather-O-meter.

TABLE 1

| Ultraviolet Absorber | Polarity | Vapor Pressure at 100° C. (KPa) | Durability of Primer Layer Containing Ultraviolet Absorber | Remark |
|---|---|---|---|---|
| (A) | little | — | (insoluble in primer) | |
| (B) | high | — | " | |
| (C) | high | $1.7 \times 10^{-4}$ | peel in 2000 hr | |
| (D) | high | $4.8 \times 10^{-4}$ | peel in 2100 hr | |
| (E) | high | $3.2 \times 10^{-5}$ | peel in 2200 hr | 100% evaporation at 330° C. |
| (F) | little | $1.0 \times 10^{-5}$ | peel in 2500 hr | |
| (G) | little | — | (insoluble in primer) | |
| (H) | little | $5.2 \times 10^{-6}$ | peel in 2500 hr | 100% evaporation at 290° C. |
| (I) | little | $4.1 \times 10^{-6}$ | peel in 2800 hr | |
| (J) | little | $1.5 \times 10^{-5}$ | adhesion weakened | |
| (K) | little | — | (insoluble in primer) | |
| (L) | little | $1.6 \times 10^{-7}$ | peel in 3800 hr | |

Figure 2:
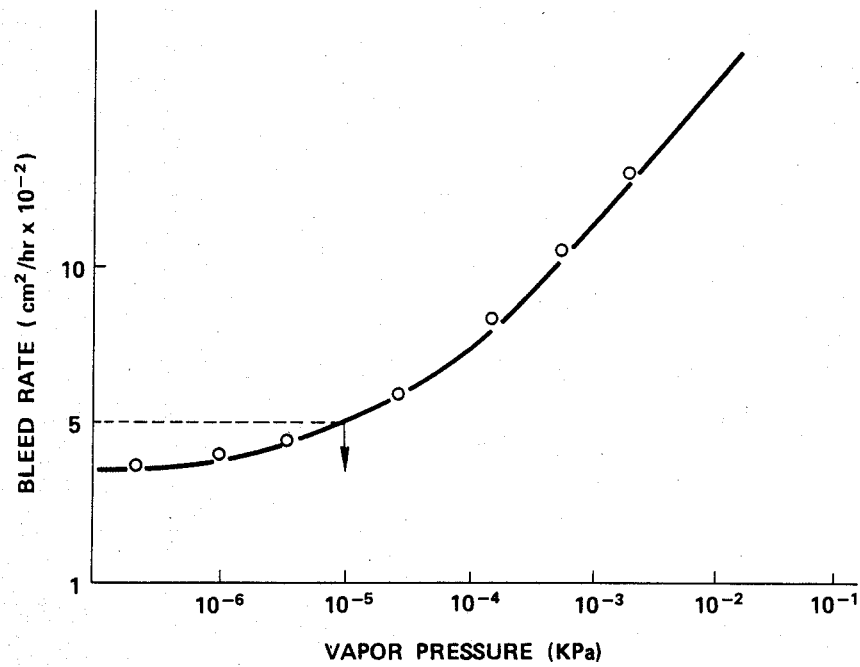
FIG. 2 is a graph showing the relationship between vapor pressures of several kinds of ultraviolet absorbers at a given temperature and bleed rates of the respective ultraviolet absorbers when added to a primer.

On several kinds of popular ultraviolet absorbers our experiment gave the result as shown in FIG. 2. The vapor pressures were measured at 100° C., and the bleed rate on the ordinate is in terms of the time factor of integrated transmittance over the wavelength range of 230–380 nm. As can be seen in FIG. 2, the bleed rate does not exceed $5 \times 10^{-2}$ cm$^2$/hr when the vapor pressure of the used ultraviolet absorber at 100° C. is not higher than $1 \times 10^{-5}$ KPa. By separate experiments it was proved that when the bleed rate is about $5 \times 10^{-2}$ cm$^2$/hr the durability of the coating measured with a sunshine weather-O-meter reaches 3000 hr or longer. Therefore, for the primer layer 22 in the surface-hardening coating 20 according to the invention it is preferred to use an ultraviolet absorber of which the vapor pressure at 100° C. is not higher than $1 \times 10^{-5}$ KPa. Also it is preferred that the ultraviolet absorber 23 is soluble in the primer material.

The following compounds are named as typical examples of recently used ultraviolet absorbers:
(A) 2,4-di-t-butylphenyl-3',5'-di-t-butyl-4'-hydroxybenzoate (MW 438, b.p. 192° C.)
(B) p-t-butylphenyl salicylate (MW 270, b.p. 60° C.)
(C) 2,4-hydroxybenzophenone (MW 214, b.p. 140° C.)
(D) 2-hydroxy-4-methoxybenzophenone (MW 228, b.p. 60° C.)
(E) 2-hydroxy-4-n-octoxybenzophenone (MW 326, b.p. 45° C.)
(F) 2-(2'-hydroxy-3'-t-butyl-5'-methylphenyl)-5-chlorobenzotriazole (MW 315.5, b.p. 127° C.)
(G) 2-(2'-hydroxy-3',5'-di-t-butylphenyl)-5-chlorobenzotriazole (MW 358, b.p. 154° C.)
(H) 2-(2'-hydroxy-3',5'-di-t-butyl)benzothiazole (MW 323, b.p. 152° C.)
(I) 2-(2'-hydroxy-3',5'-di-t-amylphenyl)benzotriazole (MW 351, b.p. 77° C.)

In general, an indication of the bleeding tendency of an ultraviolet absorber is its evaporation loss. From our experimental results, an ultraviolet absorber which exhibits relatively large evaporation loss such as (H) in Table 1 is lower in the bleeding tendency than another ultraviolet absorber relatively small in evaporation loss such as (E) in Table 1.

Among the ultraviolet absorbers in Table 1, the triazoles (F), (I) and (L) and the thiazole (H) are not higher than $1 \times 10^{-5}$ KPa in vapor pressure at 100° C. and accordingly are preferred as low bleeding tendency ultraviolet absorbers for use in the present invention.

In the surface-hardening coating film 20 according to the invention the amount of the ultraviolet absorber 23 in the primer layer 22 must be in the range from 0.5 to 50 wt% of the plastic component of the primer. If the amount of the ultraviolet absorber 23 is less than 0.5 wt% the effect of using this additive will be inappreciable. On the other hand, the addition of more than 50 wt% of ultraviolet absorber to the primer will result in deterioration of the principal properties of the primer layer 22. Usually it is suitable that the ultraviolet absorber 23 amounts to 3–20 wt% of the plastic component of the primer.

The primer layer 22 and the hard-coat layer 24 are each formed by a conventional coating method, which is not limited and may be spraying method, dipping method or flow coating method by way of example.

The invention will further be illustrated by the following nonlimitative examples.

EXAMPLE 1

A primer containing an ultraviolet absorber was prepared by the following process.

First, 5 g of 2-[2-hydroxy-3,5-bis($\alpha,\alpha$-dimethylbenzyl)phenyl]benzotriazole ((L) in Table 1: supplied from Ciba-Geigy Co. under the tradename Cinuvin 900) was mixed with 95 g of a mixed solvent consisting of 20 wt% of toluene, 40 wt% of ethyl acetate and 40 wt% of industrial gasoline for use in dissolving rubber. The mixture was stirred for 20 min at room temperature to thereby obtain a solution. Then, 1 part by weight of this solution was mixed with 1 part by weight of a commercial primer, PH91 of Toshiba Silicone Co., which was a solution of a thermoplastic acrylic resin in a mixture of ethyl cellosolve and cellosolve acetate. The mixture was stirred for 20 min at room temperature. In the thus prepared primer the amount of the triazole used as ultraviolet absorber was 8 wt% of the acrylic resin.

In this example a polycarbonate plate was used as the plastic body 10 in FIG. 1. After preliminary washing with Freon the polycarbonate plate was subjected to ultrasonic cleaning for 15 min and then to steam cleaning for 25 min. After that the polycarbonate plate was placed in a chamber air-conditioned to a temperature of 25° C. and relative humidity of 45% or below, and the primer containing the triazole was applied to a major surface of the plate by spraying, followed by air drying for 25 min, to thereby form a primer layer having a thickness of about 1.25 $\mu$m. Next, a commercial hardcoat material, Tosguard 510 of Toshiba Silicone Co., which was a mixed solution of colloidal silica and methyl sesquisiloxane in a solvent consisting of ethanol, isobutanol and cellosolve acetate, was applied onto the primer layer by a flow-coating method, followed by air drying for 20 min, to thereby form a hard-coat layer having a thickness of about 9 $\mu$m.

The polycarbonate plate coated with the primer and the hard-coat material was baked at 120° C. for 60 min. As the result, a coating film of the two-layer structure as shown in FIG. 1 was formed on the polycarbonate plate surface.

REFERENCE 1

For comparison, 2,4-hydroxybenzophenone ((C) in Table 1) was used as an ultraviolet absorber in place of the triazole in Example 1. Otherwise the entire process of Example 1 was repeated to produce an almost identical coating film on the polycarbonate plate.

For evaluation of the surface hardness and durability of the coatings produced in Example 1 and Reference 1, the following tests were made. The results are shown in Table 2.

(1) Bleeding Tendency of Ultraviolet Absorber

For each coating film the shift rate of the absorbance of ultraviolet rays of 330 nm wavelength was measured. The shift rate is relatively low while the ultraviolet absorber in the coating film remains in a sufficient quantity and effectively functions. In Table 2 the results are shown by relative values.

(2) Taber Abrasion Test

The test was in accordance with JIS K 6902. The abrading wheel was of the CS-10F type and was turned at 70 rpm. The amount of abrasion was measured after 100 turns.

(2B) Sand Fall Test

The test was generally in accordance with ASTM D 698. No. 80 carborundum grains were dropped from the height of 635 mm at a rate of 200–250 g per minute. Haze value (ratio of transmittance of diffused rays to transmittance of whole rays) of the sample was measured before and after testing to indicate the degree of abrasion by the difference between the two haze values.

(3) Test with Sunshine Weather-O-meter

The black panel temperature was 13° C. The light time in each cycle was 102 min and the rainfall time was 18 min.

(3B) Test with Dew-panel Light Control Weather-O-meter

The irradiation time in each cycle was 8 hr: the temperature was 70° C. and the energy density was 2.8 mW/cm$^2$/sec. The dewing time was 4 hr: the temperature was 50° C.

(4) Degree of Yellowing

Yellowing index (YI) value of the sample was measured after testing with the sunshine weather-O-meter for 600 hr.

(5) Coating Film Thickness

The thickness of each coating film sample was measured on an electron micrograph of a section.

TABLE 2

| Test Item | Coating of Example 1 | Coating of Reference 1 |
| --- | --- | --- |
| Bleeding Tendency of Ultraviolet Absorber | 0.63 | 1 |
| Surface Hardness | | |
| (A) Taber Abrasion Test | 3.0 | 3.1 |
| (B) Sand Fall Test | 5.2 | 5.1 |
| Weatherability | | |
| (A) Sunshine Weather-O-meter | peel in 3300 hr | peel in 2000 hr |
| (B) Dew-panel Light Control Weather-O-meter | peel in 1200 hr | peel in 700 hr |
| Degree of Yellowing | 10 | 25 |
| Coating Film Thickness | 10.25 $\mu$m | 10.25 $\mu$m |

As can be seen in Table 2, the coating film of Example 1 was comparable in surface hardness to the coating film of Reference 1. With respect to durability, the coating film of Example 1 was unquestionably superior. That is, the durability indicated by the results of testing with weather-O-meter was almost twice as high as the durability of Reference 1, and the bleeding tendency of the ultraviolet absorber was smaller by about 50%. As to yellowing after testing with the sunshine weather-O-meter, yellowing of the coating film of Example 1 was almost inappreciable whereas yellowing in the case of Reference 1 was clearly appreciable with the naked eye and was detrimental to the commercial value of the coated article.

Figure 3:
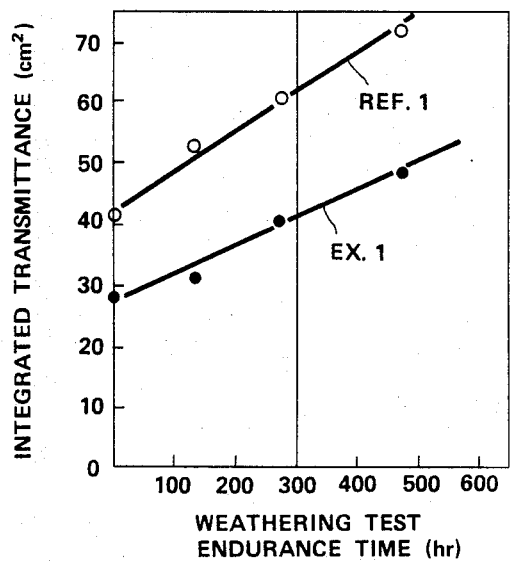
FIG. 3 is a graph showing the degree of aging deterioration of a surface-hardening coating in an example of the invention in comparison with a conventional coating.

Besides the above tests, a cumulative amount of absorption of ultraviolet rays over the wavelength range of 230–380 nm was examined for each of the coating films of Example 1 and Reference 1 by using the dew-panel light control weather-O-meter and by integrating the transmittance values. The results are shown in FIG. 3, wherein the slope of each curve is indicative of the rate of bleeding of the ultraviolet absorber contained in the coating film. It is understood that the bleeding rate in the case of Example 1 was about ⅔ of the rate in the case of Reference 1.

Figure 4:
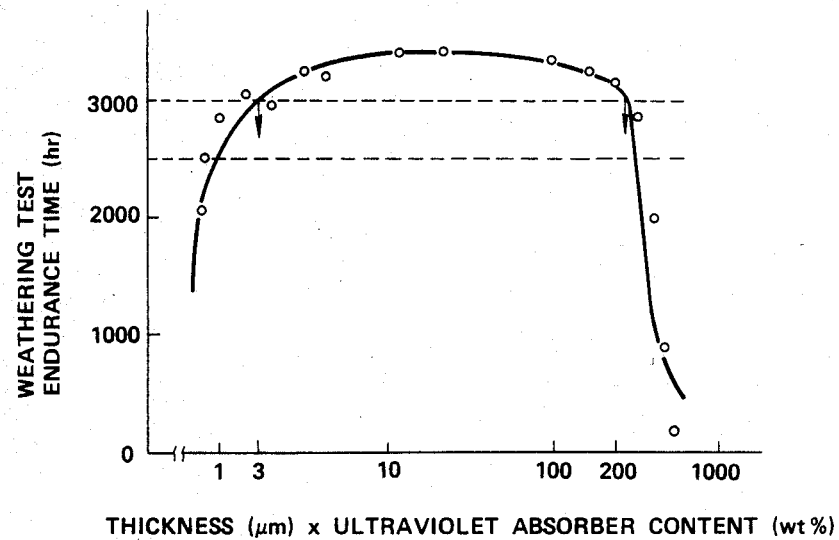
FIG. 4 is a graph showing the dependence of durability of a surface-hardening coating according to the invention on the product of the thickness of the primer layer in the coating and the content of an ultraviolet absorber in the primer layer.

In a separate experiment, the primer layer in Example 1 was variously modified by varying the proportion of the triazole used as ultraviolet absorber to the acrylic resin and the thickness of the primer layer, and the durabilities of the resultant coating films were examined by testing with the sunshine weather-O-meter. The result is shown in FIG. 4. It is understood that the durability becomes 3000 hr or above when the product of the thickness (in microns) of the primer layer and the proportion (wt%) of the ultraviolet absorber to the resin component of the primer is in the range from 3 to about 200.

With respect to the plastic lenses for automobile headlamps produced by using various kinds of conventional primers and hard-coat materials, we have made comparisons between the results of outdoor exposure tests and the results of weathering tests with sunshine weather-O-meter and have confirmed that 300 hr durability by the weathering test corresponds to about 1 year of outdoor exposure. In the cases of the conventional plastic lenses the maximum durability by the weathering test was at the level of 2000 hr, so that a practical service life would have been 5-6 years which are shorter than a truly required service life. By using the present invention it has become possible to raise the durability by the weathering test to the level of 3000 hr, which means a practical durability of about 10 years.

EXAMPLE 2

A primer containing an ultraviolet absorber was prepared by first dissolving 5 g of the triazole used in Example 1 ((L) in Table 1) in a mixed solvent consisting of 15 g of toluene, 40 g of ethyl acetate and 45 g of industrial gasoline for use in dissolving rubber and then mixing the entire quantity of this solution with 600 g of a commercial primer (for use with a silicone base commercial hard-coat material, MR-3 of Mitsubishi Gas Chemicals Co.).

In this example a methacrylic resin plate was used as the plastic body 10 in FIG. 1. The methacrylic resin plate was cleaned by the procedure described in Example 1 and was placed in a chamber air-conditioned to a temperature of 25° C. and relative humidity of 45% or below. The primer prepared in this example was applied to a major surface of the methacrylic resin plate by a flow-coating method, followed by air drying for 30 min. Then the resin plate was baked at 110° C. for 20 min to thereby complete a primer layer having a thickness of about 8 μm. Next, the hard-coat material MR-3 was applied onto the primer layer by a flow-coating method, followed by air drying for 20 min. Then baking was performed at 120° C. for 120 min to thereby produce a surface-hardening coating film of the two-layer structure as shown in FIG. 1 on the methacrylic resin plate surface.

REFERENCE 2

The entire process of Example 2 was repeated except that the addition of the triazole to the primer was omitted. Therefore, the resultant surface-hardening coating did not contain any ultraviolet absorber in the primer layer.

The coatings produced in Example 2 and Reference 2 were subjected to the Taber abrasion test for evaluation of surface hardness. The abrading wheel was of the CS-10 type, which was turned at 70 rpm under a load of 500 g. After 100 turns, haze value was measured to be 7.0 on both the coating of Example 2 and the coating of Reference 2.

By testing with a sunshine weather-O-meter, minute cracks appeared in the coating of Reference 2 in 500 hr. In contrast, no change appeared in the coating of Example 2 even after continuing the test for 3000 hr.

EXAMPLE 3

Figure 5:
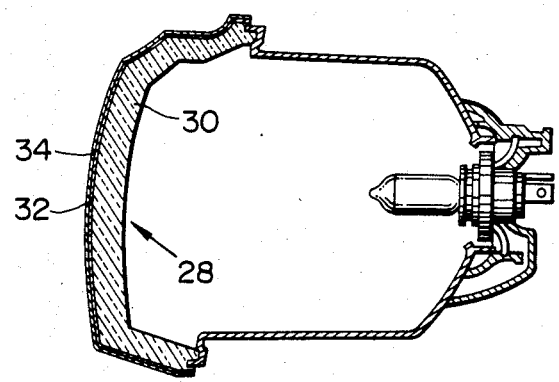
FIG. 5 is a longitudinal sectional view of an automobile headlamp unit having a plastic lens as an example of the invention.
Figure 6:
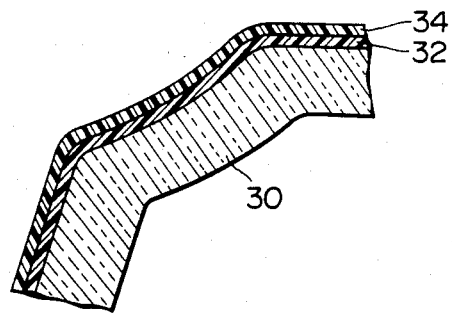
FIG. 6 is a fractional and explanatory enlargement of the plastic lens in FIG. 5.

FIG. 5 shows an automobile headlamp having a plastic lens 28. This example relates to coating of this plastic lens 28.

The lens body 30 was moulded of a polycarbonate resin and was cleaned by the procedure described in Example 1. After that a primer layer 32 and a hard-coat layer 34 were formed in turn by using the same materials and the same coating process as in Example 1. Therefore, the primer layer 32 contained a triazole ((L) in Table 1) as ultraviolet absorber.

Samples of the thus produced plastic lens 28 were subjected to the evaluation tests described hereinbefore in connection with Example 1. The results were nearly equal to the data in the columm of Example 1 in Table 2. In addition, the surface hardness of the coating of Example 3 was examined by another abrasion test. In this test, 5 g of No. 0000 steel wool was compacted into a block which was formed with a contact face having an apparent area of 0.64 cm$^2$, and the steel wool block was reciprocatingly moved on the surface of the coating sample under a predetermined load. In general, the surface hardness of the plastic lens 28 for the headlamp is judged to be sufficient if no scratch is produced on the coating surface by reciprocation of the steel wool block twenty times under a load of 270 g. In testing the plastic lens 28 produced in Example 3 the load was increased to 850 g and the steel wool block was reciprocated more than twenty times, but no scratch was produced on the hard-coat layer 34 of the coating.

EXAMPLE 4

A primer containing an ultraviolet absorber was prepared by first preparing a solution of the triazole used in Example 1 ((L) in Table 1) in the same manner as in Example 1 and then mixing the solution with a commercial primer, PH93 of Toshiba Silicone Co., which was a solution of a thermoplastic acrylic resin in a mixture of ethyl cellosolve and diacetol. In the thus prepared primer the triazole amounted to 8 wt% of the acrylic resin.

In this example the plastic body to be coated was a lens moulded of a polymethyl methacrylate resin containing a light-diffusing agent. This lens was for use in a light-receiving window of an automatic turn-on and turn-out lamp unit. After preliminary washing with Freon the plastic lens was subjected to ultrasonic cleaning for 15 min and then to steam cleaning for 15 min. Then the primer containing the triazole was applied to the outer surface of the plastic lens by spraying and, after air drying for 30 min, baking was performed at 90° C. for 30 min to thereby form a primer layer having a thickness of about 1.5 μm. Next, the commercial hard-coat material Tosguard 510 mentioned in Example 1 was applied onto the primer layer by spraying. After air drying for 30 min, baking was performed at 90° C. for 180 min to thereby complete a hard-coat layer having a thickness of about 7 μm.

REFERENCE 3

For comparison, the methacrylic resin lens used in Example 4 was coated with a different commercial hard-coat material, which was of an acrylic resin base and contained 2-hydroxy-4-n-octoxybenzophenone ((E) in Table 1) as an ultraviolet absorber. The primer for this hard-coat material did not contain any ultraviolet absorber.

The coatings of Example 4 and Reference 3 were subjected to the Taber abrasion test and weathering test with a sunshine weather-O-meter. The results are shown in Table 3. In the Taber abrasion test, abrading wheel of the CS-10F type was turned at 70 rpm under a load of 500 g. Haze value of the sample coating was measured before testing and after 100 turns of the abrading wheel to indicate the abrasion resistance of the sample by the amount of change of haze value.

TABLE 3

| | Abrasion Resistance (change of haze value) | Weather Resistance |
|---|---|---|
| Coating of Reference 3 | 4.1% | 700 hr |
| Coating of Example 4 | 2.0% | 3800 hr |

What is claimed is:

1. A plastic part comprising:
a plastic body; and
a surface-hardening coating film which is formed on a surface of said plastic body and comprises a plastic primer layer laid directly on said surface and a hard-coat layer of a polymer base composition laid on said primer layer, said primer layer comprising an organic resin and an ultraviolet absorber which is low in bleeding tendency and amounts to 0.5–50 wt% of the organic resin of the primer, said ultraviolet absorber being an organic compound having a vapor pressure not higher than $1 \times 10^{-5}$ KPa at 100° C.

2. A plastic part according to claim 1, wherein said organic compound is a triazole selected from the group consisting of 2-(2'-hydroxy-3'-t-butyl-5'-methylphenyl)-5-chlorobenzotriazole, 2-(2'-hydroxy-3',5'-di-t-amylphenyl)benzotriazole and 2-[2-hydroxy-3,5-bis(α,α-dimethylbenzyl)phenyl]benzotriazole.

3. A plastic part according to claim 1, wherein said organic compound is 2-(2'-hydroxy-3',5'-di-t-butyl)benzothiazole.

4. A plastic part according to claim 1, wherein said plastic component of the primer is an acrylic resin.

5. A plastic part according claim 1, wherein said plastic component of the primer is a silicone resin.

6. A plastic part according to claim 1, wherein said plastic component of the primer is a polyurethane resin.

7. A plastic part according to claim 1, wherein said hard-coat layer is formed of a silicone base composition.

8. A plastic part according to claim 1, wherein said hard-coat layer is formed of a melamine resin base composition.

9. A plastic part according to claim 1, wherein said hard-coat layer is formed of an acrylic resin base composition.

10. A plastic part according to claim 1, wherein said plastic body is a transparent body.

11. A plastic part according to claim 1, wherein the durability of said coating is at least about 3000 hrs. as measured with a sunshine weather-O-meter.

12. A plastic lens for an automobile headlamp unit, comprising:
a transparent plastic lens body; and
a surface-hardening coating film which is formed on an outer surface of said lens body and which comprises a plastic primer layer laid directly on said surface and a hard-coat layer of a polymer base composition laid on said primer layer, said primer layer comprising an organic resin and an ultraviolet absorber which is low in bleeding tendency and amounts to 0.5–50 wt% of the organic resin of the primer, said ultraviolet absorber being an organic compound having a vapor pressure not higher than $1 \times 10^{-5}$ KPa at 100° C.

13. A plastic lens according to claim 12, wherein said organic compound is a triazole.

14. A plastic part comprising:
a plastic body; and
a surface-hardening coating film which is formed on a surface of said plastic body and comprises a plastic primer layer laid directly on said surface and a hard-coat layer of a polymer base composition laid on said primer layer, said primer layer comprising an organic resin and 2-[2-hydroxy-3,5-bis(α,α-dimethylbenzyl)phenyl]benzotriazole as an ultraviolet absorber which is low in bleeding tendency and amounts to 0.5–50 wt% of the organic resin of the primer, said ultraviolet absorber having a vapor pressure not higher than $1 \times 10^{-5}$ KPa at 100° C.

15. A plastic lens for an automobile headlamp unit, comprising:
a transparent plastic lens body; and
a surface-hardening coating film which is formed on an outer surface of said lens body and which comprises a plastic primer layer laid directly on said surface and a hard-coat layer of a polymer base composition laid on said primer layer, said primer layer comprising an organic resin and 2-[2-hydroxy-3,5-bis(α,α-dimethylbenzyl)phenyl]benzotriazole as an ultraviolet absorber which is low in bleeding tendency and amounts to 0.5–50 wt% of the organic resin of the primer, said ultraviolet absorber having a vapor pressure not higher than $1 \times 10^{-5}$ KPa at 100° C.

* * * * *